(12) United States Patent
McDaniel et al.

(10) Patent No.: US 11,593,044 B1
(45) Date of Patent: Feb. 28, 2023

(54) UPDATE PRINT DATA STORED IN MEMORY DEVICES OF PRINTER CARTRIDGES

(71) Applicant: Hewlett-Packard Development Company, L.P., Spring, TX (US)

(72) Inventors: Gabriel Scott McDaniel, Boise, ID (US); Paul L Jeran, Boise, ID (US); Juan Carlos Guzman, Boise, ID (US); George Henry Kerby, Boise, ID (US); Katelyn Christene Morse, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/545,776

(22) Filed: Dec. 8, 2021

(51) Int. Cl.
*G06F 3/12* (2006.01)
(52) U.S. Cl.
CPC .......... *G06F 3/1219* (2013.01); *G06F 3/1231* (2013.01); *G06F 3/1287* (2013.01)
(58) Field of Classification Search
CPC .................................................... G06F 3/1219
USPC ....................................................... 358/1.15
See application file for complete search history.

(56) References Cited

U.S. PATENT DOCUMENTS

| 10,432,825 | B2 * | 10/2019 | Nichols | H04N 1/6058 |
| 2002/0140966 | A1 * | 10/2002 | Meade, II | G06F 8/65 |
| | | | | 358/1.15 |
| 2014/0002537 | A1 * | 1/2014 | Thacker | G03G 15/5079 |
| | | | | 347/19 |

* cited by examiner

*Primary Examiner* — Jacky X Zheng
(74) *Attorney, Agent, or Firm* — Brooks, Cameron & Huebsch, PLLC (57) ABSTRACT

According to examples, an apparatus may include a processor and a memory on which is stored instructions that when executed by the processor, cause the processor to determine that data stored in a memory device of a printer cartridge installed in a printing device is to be updated. The printing device may be in remote communication with the apparatus via a network connection. The instructions may also cause the processor to identify update data that is to be used to update the data stored in the memory device. The instructions may further cause the processor to communicate, via the network connection with the printing device, the identified update data to the printing device. The printing device may update the data stored in the memory device of the printer cartridge with the update data.

15 Claims, 4 Drawing Sheets

UPDATE PRINT DATA STORED IN MEMORY DEVICES OF PRINTER CARTRIDGES

BACKGROUND

Printing devices, such as laser printers, typically use a printer cartridge that contains a recording material such as toner to record an image on a medium such as paper. For instance, a recording drum may be charged and a latent image may be formed on the drum by a laser. The latent image may be developed on the drum by developer or toner particles and this image may be transferred directly or indirectly onto a medium. Some printer cartridges include a memory device that may include information pertaining to parameters of the printer cartridges.

BRIEF DESCRIPTION OF DRAWINGS

Features of the present disclosure are illustrated by way of example and not limited in the following figure(s), in which like numerals indicate like elements, in which.

DETAILED DESCRIPTION

For simplicity and illustrative purposes, the principles of the present disclosure are described by referring mainly to examples thereof. In the following description, numerous specific details are set forth in order to provide an understanding of the examples. It will be apparent, however, to one of ordinary skill in the art, that the examples may be practiced without limitation to these specific details. In some instances, well known methods and/or structures have not been described in detail so as not to unnecessarily obscure the description of the examples. Furthermore, the examples may be used together in various combinations.

Throughout the present disclosure, the terms "a" and an are intended to denote at least one of a particular element. As used herein, the term "includes" means includes but not limited to, the term "including" means including but not limited to. The term "based on" means based at least in part on.

As discussed herein, some printer cartridges include a memory device on which information pertaining to parameters of the printer cartridges may be stored. In many instances, a printing device may detect that a printer cartridge has been installed into the printing device and the printing device may read the information from the memory device. The printing device may use this information for operation of the printing device based upon the printer cartridge parameters. Often, the memory device includes information related to the print cartridge capacity. The printing device may read the printer cartridge capacity and print a status page telling the user information about the printer cartridge. The status page may include information such as manufacture date, printer cartridge type, and estimated page count for the printer cartridge.

In many instances, the information is stored in the memory device during or shortly after manufacture of the printer cartridge. In addition, the information stored in the memory device is often static in that the information is not changed or updated after the information is initially stored in the memory device. As a result, if there are improvements or upgrades available for the information, the information stored in the memory device may not be updated with such improvements or upgrades.

If there is an issue with or an upgrade for the information contained in the memory devices of known printer cartridges, the printer cartridges may need to be removed from a distributer or point of sale and the information may be corrected and/or updated. The printer cartridges may also be sent back to the manufacturer or other location where the information contained in the memory devices of the printer cartridges may be updated. In other instances, a user of a printing device may be required to remove the printer cartridge from the printing device and may need to ship the printer cartridge to a location where the information may be corrected and/or updated if the user is unable to otherwise perform these actions.

A technical issue associated with known printer cartridges with memory devices may be that the correction and/or updating of information stored in the memory devices may be labor and resource intensive. For instance, the movement of the printer cartridges such as via mail, freight, delivery services, etc., in order for the corrections and/or updates to be implemented and for the printer cartridges to be returned may cause fuel and other resources to be consumed. Additionally, implementation of the corrections and/or updates in known manners may cause additional electrical and other resource consumption as well as the use and subsequent discarding of additional packaging materials.

Disclosed herein are apparatuses that may identify update data that is to be used to update data stored in a memory device of a printer cartridge while the printer cartridge is installed within a printing device. Particularly, the apparatuses disclosed herein may update the data by communicating the update data via a remote connection, such as a network connection, with the printing device. The printing device may be interfaced with the memory device of the printer cartridge and may update the data stored in the memory device with the update data. Also disclosed herein are methods for updating the data stored in memory devices of printer cartridges in printing devices and computer-readable mediums that may include instructions that may cause the processor to perform the methods.

As discussed herein, the data stored in the memory device may include print data that the printing device within which the printer cartridge is installed may access. The print data may include, for instance, data that the printing device is to access to perform printing operations using the printer cartridge. For instance, the print data may include print modes available for use in performing print operations with the printer cartridge. The print data may also or alternatively include color tables and/or color schemes that the printing device may use to perform printing operations using the printer cartridge. In some instances, the print data may include an immutable and unique identification property such that the printing device firmware may identify the printer cartridge. In some instances, the identification property may be used to authenticate the printer cartridge.

The processor may determine that the data stored in the memory device of a printer cartridge is to be updated for any of a number of various reasons. For instance, the processor may determine that the data is to be updated in order for the data to be activated or deactivated. As another example, the processor may determine that the data is to be updated when there is a newer version of the data. As a further example, the processor may determine that the data is to be updated when a service level of a user of a printing device within which the printer cartridge is installed changes, for instance, if the user changes from a free to a paid service level. As a yet further example, the processor may determine that the data is to be updated when a user requests that some print operations are to be customized. These may include requests for printing custom colors using custom color charts and/or custom color schemes.

Through implementation of the features of the present disclosure, data loaded on a memory device of a printer cartridge may be updated while the printer cartridge is installed within a printing device. In this regard, printing capabilities of the printing device through use of the printer cartridge may be modified, e.g., improved, fixed, etc., over time. As a result, printing performance, such as recording medium usage, colors available for printing, available print modes, etc., may be improved over time. For instance, the data may be updated with print modes that consume less or minimized amounts of energy, consume greater amounts of recording medium for better visual results, etc. Additionally, the data may be updated without requiring that the printer cartridge be shipped to another location. Technological improvements afforded through implementation of the features of the present disclosure may thus include reduced energy and packaging material usage as well as increased printing performance.

Printing devices often include firmware that is to perform print operations using the data stored in the memory device of the printer cartridge. According to examples disclosed herein, the firmware may be updated using the update data. For instance, a processor of a printing device may receive the update data and may update the firmware by adding to, overriding, and/or overwriting the firmware. In some examples, the processor of the printing device may update the firmware in addition to updating the print data stored in the memory device of the printer cartridge. In other examples, the processor of the printing device may update the firmware without updating the print data. In any of these examples, the firmware may be updated such that the firmware may use various print modes, color tables, color schemes, and/or the like.

Figure 1:
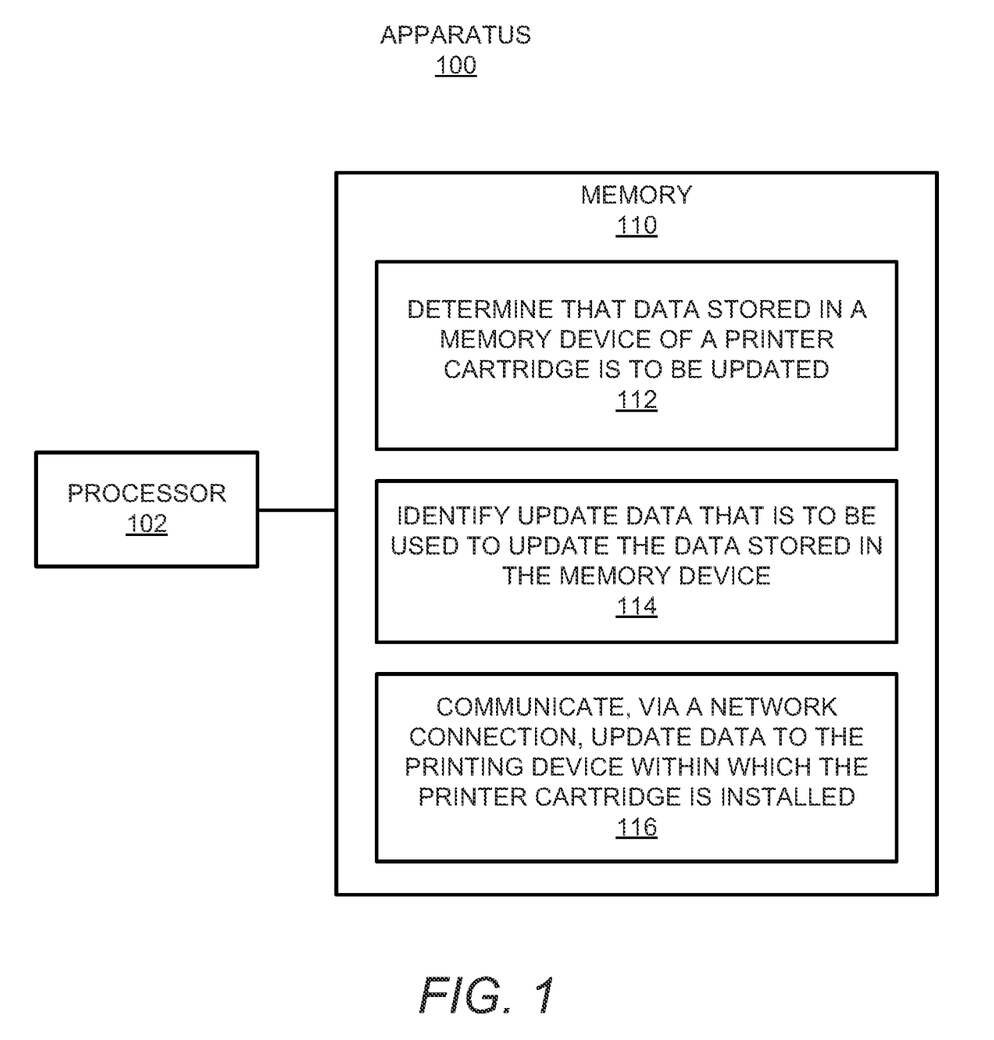
FIG. 1 shows a block diagram of an example apparatus, in which an example processor of the apparatus may communicate, via a network connection, update data to a printing device, in which the printing device is to cause data stored in a memory device of a printer cartridge installed within the printing device to be updated.

Reference is first made to FIG. 1, which shows a block diagram of an example apparatus 100, in which an example processor 102 of the apparatus 100 may communicate, via a network connection, update data to a printing device, in which the printing device is to cause data stored in a memory device of a printer cartridge installed within the printing device to be updated. It should be understood that the example apparatus 100 may include additional features and that some of the features described herein may be removed and/or modified without departing from the scope of the apparatus 100.

Generally speaking, the apparatus 100 may be a computing device such as a server computer. In addition, the processor 102, which may control operations of the apparatus 100, may be a semiconductor-based microprocessor, a central processing unit (CPU), an application specific integrated circuit (ASIC), a field-programmable gate array (FPGA), and/or other hardware device. The apparatus 100 may also include a memory 110, which may also be termed a computer readable medium. The memory 110 may be, for example, a Random Access memory (RAM), an Electrically Erasable Programmable Read-Only Memory (EEPROM), a storage device, or the like. The memory may be a non-transitory computer readable storage medium, where the term "non-transitory" does not encompass transitory propagating signals.

Although the apparatus 100 is depicted as having a single processor 102, it should be understood that the apparatus 100 may include additional processors and/or cores without departing from a scope of the apparatus 100. In this regard, references to a single processor 102 as well as to a single memory 110 may be understood to additionally or alternatively pertain to multiple processors 102 and/or multiple memories 110. In addition, or alternatively, the processor 102 and the memory 110 may be integrated into a single component, e.g., an integrated circuit on which both the processor 102 and the memory 110 may be provided. In addition, or alternatively, the operations described herein as being performed by the processor 102 may be distributed across multiple apparatuses 100 and/or multiple processors 102.

As shown, the memory 110 may have stored thereon a set of instructions 112-116 that the processor 102 may execute. In other examples, the instructions 112-116 may be stored as software on the processor 102. In any of these examples, the processor 102 may execute the instructions 112 to determine that data (also referenced herein as print data) stored in a memory device of a printer cartridge is to be updated. The processor 102 may make this determination in any of a number of various manners as discussed herein.

The processor 102 may execute the instructions 114 to identify update data that is to be used to update the data stored in the memory, device 224. For instance, the processor 102 may identify the update data as data that has been provided to the processor 102 to communicate to the printing device via a network connection. As another example, the processor 102 may access a list of available update data and may select an intended update data for the print data stored in the memory device to identify the update data. It should be understood that the processor 102 may identify the update data in manners other than those explicitly discussed in the present disclosure.

The processor 102 may execute the instructions 116 to communicate, via the network connection with the printing device, the identified update data to the printing device. As also discussed herein, the printing device is to update the data stored in the memory device of the printer cartridge with the update data. In some examples, the processor 102 may establish a secure connection with the printing device 220 prior to communicating the identified update data to the printing device. For instance, the processor 102 may determine whether the printing device and/or the printer cartridge is authorized to receive the update data. The processor 102 may employ any suitable authorization technique to determine whether the printing device and/or the printer cartridge is authorized to receive the update data. For instance, a separate authentication server (not shown) may authenticate the printing device and/or the printer cartridge and may inform the processor 102 as to whether the printing device and/or the printer cartridge have been authenticated. In addition, the processor 102 may communicate the update data based on a determination that the printing device and/or the printer cartridge is authorized to receive the update data.

Figure 2:
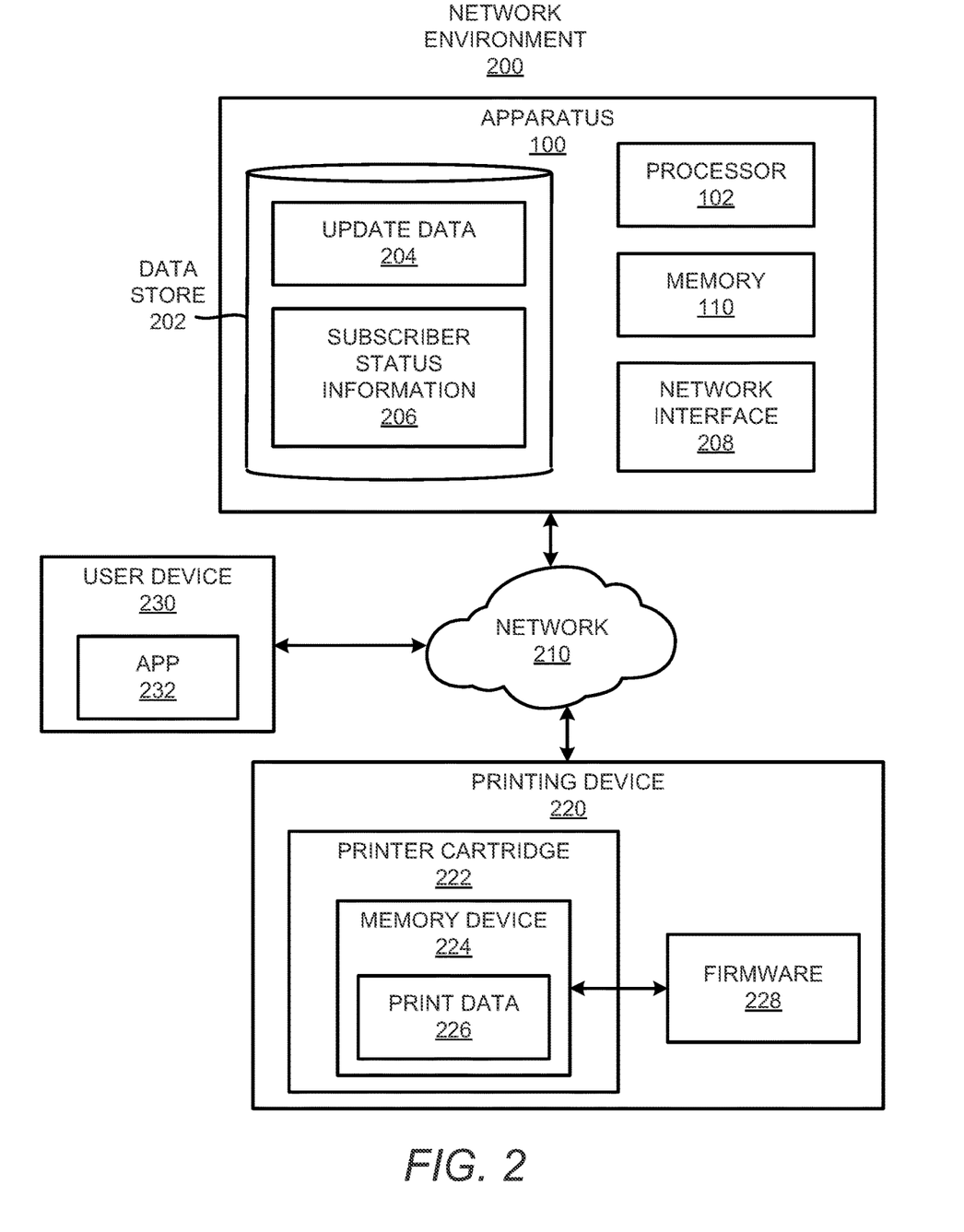
FIG. 2 depicts a block diagram of an example environment in which the apparatus depicted in FIG. 1 may be implemented.

Reference is now made to FIG. 2, which shows a block diagram of an example network environment 200 in which the apparatus 100 depicted in FIG. 1 may be implemented. As shown in FIG. 2, in addition to the apparatus 100, the network environment 200 may include a network 210, a printing device 220, and a user device 230, It should be understood that the example network environment 200 may include additional features and that some of the features described herein may be removed and/or modified without departing from the scope of the environment 200. For instance, the example network environment 200 may include a plurality of apparatuses 100, printing devices 220 and/or user devices 230.

As shown in FIG. 2, in addition to the processor 102 and the memory 110, the apparatus 100 may include a data store 202 and a network interface 208. The data store 202 may have stored thereon update data 204 and subscriber status information 206, which are described in greater detail herein. The network interface 208 may include hardware and/or software that may enable communications by the processor 102 over the network 210. The network 210 may be an internal network, such as a local area network, or an external network. In particular examples, the network 210 is the Internet and the apparatus 100 is a cloud-based server.

The printing device 220 may be a laser printer, an inkjet printer, a printing press, or the like that may form images on media, such as paper, using a recording medium, such as toner, ink, or the like. In other examples, the printing device 220 may be a three-dimensional (3D) printer that may form 3D objects from particles of build material through, for instance, selective application of a recording medium, such as a binding agent, ink, or other suitable material onto the particles of build material. In any of these examples, the recording medium may be contained in a printer cartridge 222.

Although a single printer cartridge 222 has been depicted in FIG. 2, it should be understood that a plurality of printer cartridges 222 may be inserted in the printing device 220. In these instances, the printer cartridges 222 may include different types of recording mediums with respect to each other. By way of example, the printer cartridges 222 may each contain a recording medium having a certain color. As another example, some of the printer cartridges 222 may include a recording medium that has a chemical composition that differs from the recording mediums in other printer cartridges 222. For instance, a first recording medium may be a primer for another recording medium and may thus be deposited prior to the other recording medium. In other examples, the first recording medium may be a colored ink and another recording medium may be a finishing medium that may be deposited following deposition of the first recording medium.

The printer cartridge(s) 222 may removably be installed into the printing device 220. As a result, the printer cartridge 222 may be replaced when the recording medium inside the printer cartridge 222 has reached a sufficiently low level or has been depleted. In other examples, however, while the printer cartridge 222 is installed in the printing device 220, the printer cartridge 222 may be replenished with additional recording medium when the recording medium level inside the printer cartridge 222 has reached a certain level.

As also shown in FIG. 2, the printer cartridge 222 may include a memory device 224. The memory device 224 may be attached to a housing of the printer cartridge 222 or may be housed within the printer cartridge 222. In one regard, the memory device 224 may be integrated with the printer cartridge 222 and may thus be separate from the printing device 220. According to examples, the memory device 224 may be an erasable read-only memory device, such as a flash memory device, erasable programmable read-only memory (EPROM), electrically erasable programmable read-only memory (EEPROM), or the like. In this regard, the print data 226 stored in the memory device 224 may be overwritten, e.g., erased and new data may be stored. In addition or alternatively, the print data 226 may be overridden, e.g., new data may be used instead of the previously stored print data 226. Still further, the update data 204 may be added to the print data 226.

In some examples, the memory device 224 may be a standalone memory device while in other examples, the memory device 224 may be within a microcontroller, e.g., a circuit chip or an integrated circuit chip, of the printer cartridge 222. In any of these examples, the printing device 220, e.g., firmware 228 of the printing device 220, may access the memory device 224 to read the print data 226 stored in the memory device 224. The print data 226 may equivalently be defined as being stored on the memory device 224.

The print data 226 may include data that firmware 228 on the printing device 220 may use to perform print operations. In addition, the print data 226 may include an immutable and unique identification property such that the printing device 220 firmware 228 may identify the printer cartridge 222. In some instances, the unique identification property may be used to authenticate the printer cartridge 222 either by the processor 102 or a separate entity, such as an authentication server (not shown). The print data 226 may also include supply usage information that may change the firmware 228 configuration. Additional types of information that the print data 226 may include are described in greater detail elsewhere herein.

As discussed herein, the processor 102 may determine that data, e.g., the print data 226, stored in the memory device 224 is to be updated. The processor 102 may make this determination for any of a number of various reasons. Some of those reasons are discussed herein. As an example, the printing device 120 firmware 228 may determine that a certain code may be required for the firmware 228 to access the print data 226. For instance, the firmware 228 may determine that the firmware 228 may not have access to the print data 226 or to certain parts of the print data 226. The print data 226 may require the certain code for security purposes, such as to prevent the use of fraudulent printer cartridges 222. As a result, the firmware 228 may not be able to use the print data 226 in printing operations using the printer cartridge 222 and may thus be unable to print using the printer cartridge 222.

In this example, the printing device 220 may send a communication to the apparatus 100 to inform the apparatus 100 that the firmware 228 is unable to access the print data 226 or is otherwise unable to use the printer cartridge 222 for printing operations. The printing device 220 may send the communication through the network 210. The processor 102 may, based on receipt of the communication from the printing device 220, identify update data 204 that may be used to update the print data 226. In this example, the processor 102 may identify the update data 204 to be the certain code. In some examples, the certain code may be information that the printing device 220 may use to update the print data 226, in which the updated print data 226 may enable access by the firmware 228 to the information contained in the print data 226. In addition, or alternatively, the identified update data 204 may be information that the firmware 228 is to use in performing print operations with the printer cartridge 222, which may be added to the print data 226.

In some examples, the apparatus 100 may be part of a user cloud environment in which users may have any of different levels of subscriptions with a company that owns or runs subscription services. The subscription services may be for certain types of printing operations. For instance, the subscription services may include a first subscription level that enables users that have the first subscription level to have access to basic printing operations. The basic printing operations may include standard printing operations that may be available through the printing device 220, e.g., non-customizable printing operations, standard color tables, standard print modes, etc. The subscription services may also include a second subscription level that enables users that have the second subscription level to have access to advanced printing operations. The advanced printing operations may include customizable printing operations, such as customized color tables, customized fonts, customized print modes, etc.

In some examples, the first subscription level may be a free subscription account and the second subscription level may be a paid subscription account. Although two subscription levels are discussed herein, it should be understood that the users may be subscribed to additional subscription levels without departing from a scope of the present disclosure. The various subscription levels may also provide users with various other features such as number of pages that the users are permitted to print per month within a certain service plan, automatic delivery of printer cartridges and/or print mediums, and/or the like In these examples, the processor 102 may determine that the print data 226 is to be updated based on a determination that the subscription level of a user of the printing device 220 has changed. For instance, the user may have had the first subscription level and may have upgraded to the second subscription level. Alternatively, the user may have downgraded from the second subscription level to the first subscription level. As shown in FIG. 2, subscriber status information 206, e.g., the subscription levels of the users, may be stored in the data store 202 and the processor 102 may update the subscriber status information 206 as users make updates to their subscription statuses. The processor 102 may identify update data 204 corresponding to the determined change in the subscription level. In some examples, a plurality of update data 204 corresponding to various subscription levels of users may be stored in the data store 202 and the processor 102 may identify the update data 204 corresponding to the subscription level of the user.

By way of example, if the subscription level changed from a lower subscription level to a higher subscription level, the processor 102 may identify an update data 204 that may increase print services available to the user on the printing device 220. Alternatively, if the subscription level changed from a higher subscription level to a lower subscription level, the processor 102 may identify an update data 204 that may decrease print services available to the user on the printing device 220. In addition, the processor 102 may communicate, via the network connection with the printing device 220, the identified update data 204 to the printing device 220. The printing device 220 or the firmware 228 of the printing device 220 may cause the print data 226 stored in the memory device 224 of the printer cartridge 222 to be updated with the update data 204. That is, the print data 226 stored in the memory device 224 may be updated by having the print data 226 overridden, overwritten, or added to using the update data 204. The updated print data 226 may thus enhance or restrict print operations depending upon which subscription level to which the update data 204 corresponds.

As another example, the processor 102 may determine that print modes available to be used in printing operations by the printing device 220 using the printer cartridge 222 are to be updated. The processor 102 may also determine that the data stored in the memory device 224 of the printer cartridge 222 is to be updated based on the determination that the print modes available to be used in printing operations by the printing device 220 are to be updated. The processor 102 may make this determination based on, for instance, a change in the subscription level of a user of the printing device 220. The processor 102 may also or alternatively make this determination based on receipt of an instruction, for instance, from a manufacturer or service supplier of the printer cartridge 222. By way of examples, the print data 226 stored in the memory device 224 of the printer cartridge 222 may be updated to enable some print modes and/or disable some print modes for the user of the printing device 220. Some examples of print modes may include a rough draft mode, a monochrome printing mode, a color printing mode, a normal printing mode, modes directed to different types of print mediums, etc.

As a further example, the processor 102 may receive an instruction from a user of the printing device 220 to print a custom color using a custom color table or custom color scheme. The custom color may be, for instance, a unique color for a logo for an organization, a unique color for an emblem or symbol of a school or university, a user-created color, and/or the like. In some examples, a user of the printing device 220 may provide the custom color to the apparatus 100 via the network 210. For instance, the user may have installed on their user device 230, an app 232 through which the user may provide the custom color to the apparatus 100. The user device 230 may be a smartphone, a tablet computer, a laptop computer, a desktop computer, and/or the like. In addition, the app 232 may be software that users may download onto their user devices that may provide access to services provided by a cloud-based service provider. For instance, in addition to uploading the custom color, and in some examples a custom color table or custom color scheme, to the apparatus 100, users may sign up for certain subscription services, update or modify their subscription levels, upload documents to be printed, and/or the like through the app 232.

The processor 102, following receipt of the instruction for the printing device 220 to print a custom color using a custom color table or custom color scheme, the processor 102 may generate code corresponding to the printing of the custom color. The code may include the custom color table or the custom color scheme. The processor 102 may communicate the generated code as the update data 204 to the printing device 220. The printing device 220 may update the print data 226 with the update data 204 as discussed herein. In other examples, the processor 102 may access update data 204 that includes the code corresponding to the printing of the custom color.

In some examples, the apparatus 100 may be in communication with a plurality of other printing devices 220 (not shown) via the network 210. In these examples, the processor 102 may determine that a payload stored in a memory device of a printer cartridge in another printing device is to be updated. The other printing device may also be in remote communication with the apparatus 100 via a connection through the network 210. In addition, the processor 102 may communicate, via the network 210 connection with the other printing device, other update data to the other printing device. The other printing device is to update the payload stored in the memory device of the printer cartridge in the other printing device with the update data.

According to examples, the other update data may differ from the update data 204 discussed herein. In these examples, the print data 226, or equivalently, payload, stored in the memory devices 224 of multiple printer cartridges 222 may be updated using different update data 204. Accordingly, the print data 226 in the memory devices 224 of multiple ones of the printer cartridges 222 may be updated independently of each other. In other examples, the print data 226 in the memory devices 224 of multiple ones of the printer cartridges 222 may be updated using the same update data 204. In these examples, the processor 102 may communicate the update data 204 to the printing devices 220 in which the multiple ones of the printer cartridges 222 are installed to update through implementation of a batch operation.

According to examples, the firmware 228 may be updated using the update data 204. For instance, a processor (not shown) of the printing device 220 may receive the update data 204 from the apparatus 100 and may update the firmware 228 by adding to, overriding, and/or overwriting the firmware 228. In some examples, the processor of the printing device 220 may update the firmware 228 in addition to updating the print data 226 stored in the memory device 224 of the printer cartridge 222. In other examples, the processor of the printing device 220 may update the firmware 228 without updating the print data 226 stored in the memory device 224. In any of these examples, the firmware 228 may be updated such that the firmware 228 may use various print modes, color tables, color schemes, and/or the like. Thus, for instance, the printing device 220 may use the updated firmware 228 in performing printing operations with other printer cartridges 222.

Figure 3:
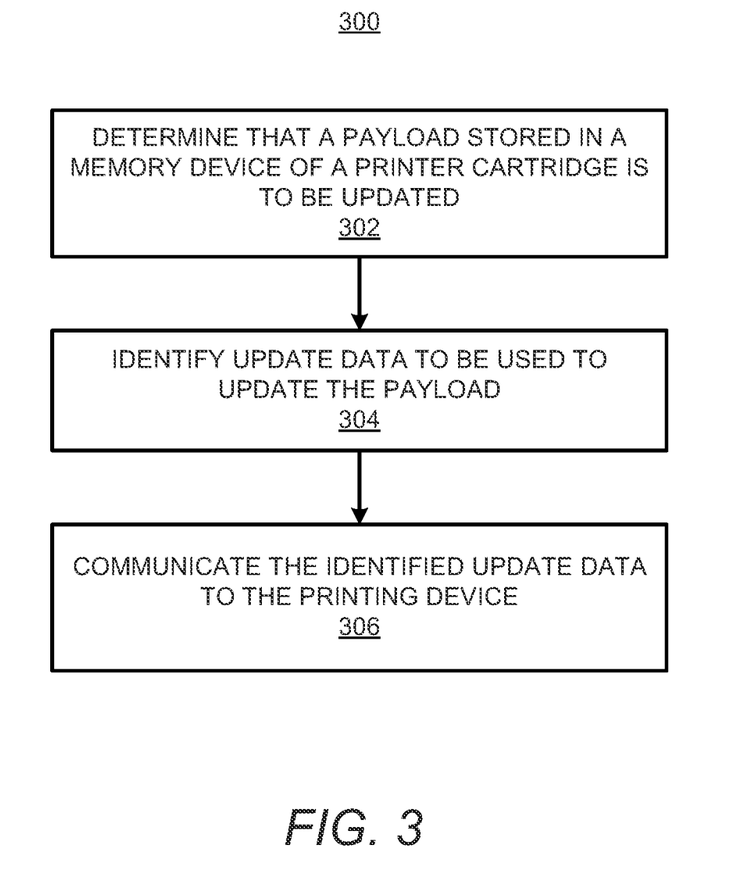
FIG. 3 depicts a flow diagram of an example method for updating print data stored in a memory device of a printer cartridge while the printer cartridge is installed in a printing device over a network connection.

Various manners in which the processor 102 of the apparatus 100 may operate are discussed in greater detail with respect to the method 300 depicted in FIG. 3. Particularly, FIG. 3 depicts a flow diagram of an example method 300 for updating print data 226 stored in a memory device 224 of a printer cartridge 222 while the printer cartridge 222 is installed in a printing device 220 over a network 210 connection. It should be understood that the method 300 may include additional operations and that some of the operations described therein may be removed and/or modified without departing from the scope of the method 300. The description of the method 300 is made with reference to the features depicted in FIGS. 1-2 for purposes of illustration.

At block 302, the processor 102 may determine that a payload (which is equivalent to the print data 226 discussed herein) stored in a memory device 224 of a printer cartridge 222 is to be updated. The processor 102 may make this determination while the printer cartridge 222 is installed in a printing device 220. The printing device 220 accesses the payload 226 to perform print operations using the printer cartridge 222.

At block 304, the processor 102 may identify update data 204 to be used to update the payload 226. The processor 102 may identify the update data 204 that corresponds to a manner in which the payload 226 is to be updated. In addition, at block 306, the processor 102 may communicate, via a network 210 connection, the identified update data 204 to the printing device 220. The printing device 220 may update the payload 226 stored in the memory device 224 of the printer cartridge 222 with the update data 204. As a result, when the printing device 220 performs a printing operation, the firmware 228 of the printing device 220 may use the updated print data 226.

According to examples, the processor 102 may determine that the payload 226 stored in the memory device 224 of the printer cartridge 222 is to be updated based on receipt of an instruction from a user of the printing device 220 to print a custom color using a custom color table or custom color scheme. In these examples, the processor 102 may generate or receive code corresponding to the printing of the custom color. The processor 102 may also communicate the code as the update data 204 to the printing device 220.

According to examples, the processor 102 may determine that the payload 226 stored in the memory device 224 of the printer cartridge 222 is to be updated based on a determination that a subscriber status of a user of the printing device 220 has changed. In these examples, the processor 102 may identify the update data 204 as data that corresponds to a current subscriber status of the user.

According to examples, the processor 102 may determine that the payload 226 stored in the memory device 224 of the printer cartridge 222 is to be updated based on a determination that print modes available to be used in printing operations by the printing device 220 are to be updated. In these examples, the processor 102 may identify the update data 204 as data that corresponds to a current set of print modes available to the printing device 220 when using the printer cartridge 222.

According to examples, the processor 102 may determine that the payload 226 stored in the memory device 224 of the printer cartridge 222 is to be updated. In these examples, the processor 102 may identify the update data 204 as data that activates the payload 226 for access by the printing device 220 in using the printer cartridge 222 or deactivates the payload 226 to prevent the printing device 220 from using the printer cartridge 222.

Some or all of the operations set forth in the method 300 may be included as utilities, programs, or subprograms, in any desired computer accessible medium. In addition, the method 300 may be embodied by computer programs, which may exist in a variety of forms both active and inactive. For example, they may exist as machine-readable instructions, including source code, object code, executable code or other formats. Any of the above may be embodied on a non-transitory computer readable storage medium.

Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Figure 4:
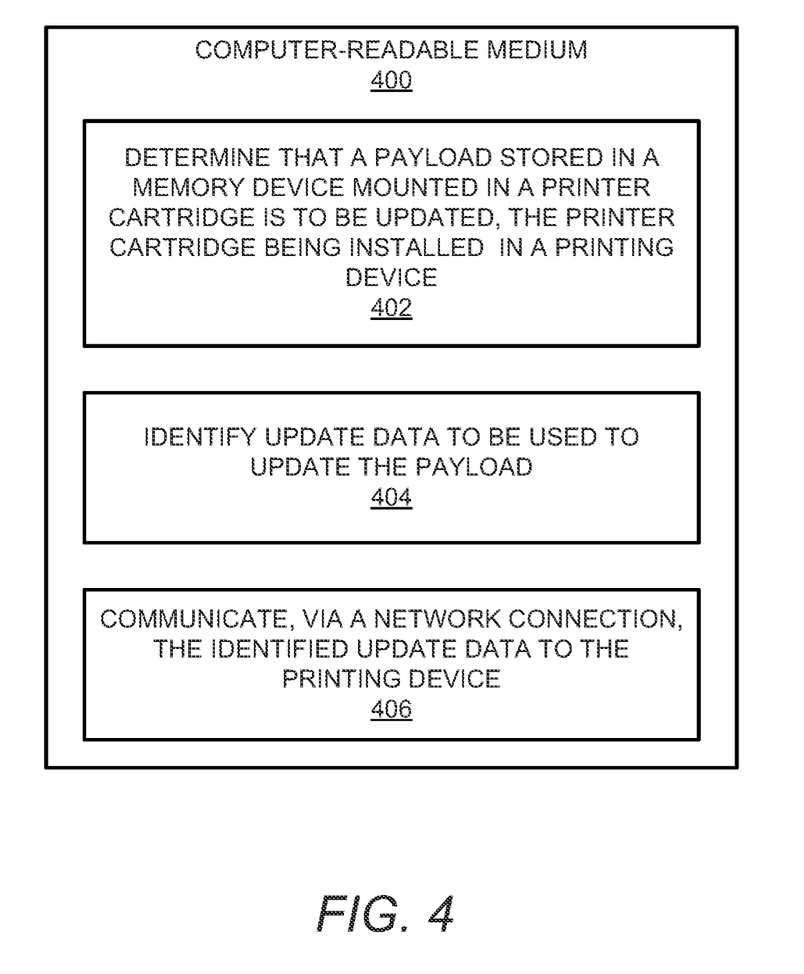
FIG. 4 shows a block diagram of an example computer-readable medium that may have stored thereon computer-readable instructions for updating print data stored in a memory device of a printer cartridge over a network connection while the printer cartridge is installed in a printing device over a network connection.

Turning now to FIG. 4, there is shown a block diagram of an example computer-readable medium 400 that may have stored thereon computer-readable instructions for updating print data 226 stored in a memory device 224 of a printer cartridge 222 over a network 210 connection while the printer cartridge 222 is installed in a printing device 220. It should be understood that the computer-readable medium 400 depicted in FIG. 4 may include additional instructions and that some of the instructions described herein may be removed and/or modified without departing from the scope of the computer-readable medium 400 disclosed herein. The computer-readable medium 400 may be a non-transitory computer-readable medium, in which the term "non-transitory" does not encompass transitory propagating signals.

The computer-readable medium 400 may have stored thereon computer-readable instructions 402-406 that a processor, such as the processor 102 of the apparatus 100 depicted in FIGS. 1 and 2, may execute. The computer-readable medium 400 may be an electronic, magnetic, optical, or other physical storage device that contains or stores executable instructions. The computer-readable medium 400 may be, for example, Random Access memory (RAM), an Electrically Erasable Programmable Read-Only Memory (EEPROM), a storage device, an optical disc, and the like.

The processor may fetch, decode, and execute the instructions 402 to determine that a payload 226 stored in a memory device 224 mounted to a printer cartridge 222 is to be updated. The printer cartridge 222 may be installed in a printing device 220, in which the printing device 220, e.g., firmware in the printing device 220, may access the payload 226 to perform print operations using the printer cartridge 222.

The processor may fetch, decode, and execute the instructions 404 to identify update data 204 to be used to update the payload 226. The processor may fetch, decode, and execute the instructions 406 to communicate, via a network 210 connection, the identified update data 204 to the printing device 220. As discussed herein, the printing device 220 is to update the payload 226 stored in the memory device 224 of the printer cartridge 222 with the update data 204.

According to examples, the processor may execute instructions to determine that the payload 226 stored in the memory device 224 of the printer cartridge 222 is to be updated based on a determination that a subscriber status of a user of the printing device 220 has changed. According to examples, the processor may execute instructions to identify the update data 204 as data that corresponds to a current subscriber status of the user.

Although described specifically throughout the entirety of the instant disclosure, representative examples of the present disclosure have utility over a \wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

What is claimed is:

1. An apparatus comprising:
a processor; and
a memory on which is stored machine-readable instructions that when executed by the processor, cause the processor to:
determine that data stored in a memory device of a printer cartridge installed in a printing device is to be updated, wherein the printing device is in remote communication with the apparatus via a network connection;
identify update data that is to be used to update the data stored in the memory device, wherein the update data includes at least one of:
instructions received from a user of the printing device to print a custom color using a custom color table or custom color scheme; or
print modes, available to be used in printing operations by the printing device, that are determined to be updated; and
communicate, via the network connection with the printing device, the identified update data to the printing device, wherein the printing device is to update the data stored in the memory device of the printer cartridge with the update data.

2. The apparatus of claim 1, wherein the instructions cause the processor to:
establish a secure connection with the printing device; and
communicate the update data following establishment of the secure connection with the printing device.

3. The apparatus of claim 1, wherein the data stored in the memory device comprises data that the printing device uses to perform print operations on the printing device using the printer cartridge.

4. The apparatus of claim 1, wherein the instructions cause the processor to:
generate code corresponding to the printing of the custom color; and
communicate the generated code as the update data to the printing device.

5. The apparatus of claim 1, wherein the instructions cause the processor to:
determine that a subscriber status of a user of the printing device has changed; and
determine that the data stored in the memory device of the printer cartridge is to be updated based on the determination that the subscriber status of the user has changed.

6. The apparatus of claim 1, wherein the instructions cause the processor to:
determine that the data stored in the memory device of the printer cartridge is to be updated based on the determination that the print modes available to be used in printing operations by the printing device are to be updated.

7. The apparatus of claim 1, wherein the instructions cause the processor to:
add to, override, and/or overwrite the data stored on the memory device with the update data.

8. The apparatus of claim 1, wherein the printing device includes firmware to perform print operations using the data stored in the memory device of the printer cartridge and wherein the firmware is to be updated with the update data.

9. A method comprising:
determining, by a processor, that a payload stored in a memory device of a printer cartridge is to be updated, wherein the printer cartridge is installed in a printing device, and wherein the printing device accesses the payload to perform print operations using the printer cartridge;
identifying, by the processor, update data to be used to update the payload, wherein the update data includes at least one of:
instructions received from a user of the printing device to print a custom color using a custom color table or custom color scheme; or
print modes, available to be used in printing operations by the printing device, that are determined to be updated; and
communicating, by the processor and via a network connection, the identified update data to the printing device, wherein the printing device is to update the payload stored in the memory device of the printer cartridge with the update data.

10. The method of claim 9, further comprising:

generating code corresponding to the printing of the custom color; and communicating the generated code as the update data to the printing device.

11. The method of claim 9, further comprising:

determining that the payload stored in the memory device of the printer cartridge is to be updated based on a determination that a subscriber status of a user of the printing device has changed; and identifying the update data as data that corresponds to a current subscriber status of the user.

12. The method of claim 9, further comprising:

identifying the update data as data that corresponds to a current set of print modes available to the printing device when using the printer cartridge.

13. The method of claim 9, further comprising:

determining that the payload stored in the memory device of the printer cartridge is to be updated; and identifying the update data as data that activates the payload for access by the printing device in using the printer cartridge or deactivates the payload to prevent the printing device from using the printer cartridge.

14. A non-transitory computer-readable medium on which is stored machine-readable instructions that, when executed by a processor, cause the processor to:

determine that a payload stored in a memory device mounted to a printer cartridge is to be updated, wherein the printer cartridge is installed in a printing device, and wherein the printing device accesses the payload to perform print operations using the printer cartridge;

identify update data to be used to update the payload, wherein the update data includes at least one of:

instructions received from a user of the printing device to print a custom color using a custom color table or custom color scheme; or print modes, available to be used in printing operations by the printing device, that are determined to be updated; and communicate, via a network connection, the identified update data to the printing device, wherein the printing device is to update the payload stored in the memory device of the printer cartridge with the update data.

15. The non-transitory computer-readable medium of claim 14, wherein the instructions cause the processor to:

determine that the payload stored in the memory device of the printer cartridge is to be updated based on a determination that a subscriber status of a user of the printing device has changed; and identify the update data as data that corresponds to a current subscriber status of the user.

* * * * *